United States Patent [19]
Weber

[11] Patent Number: 4,946,498
[45] Date of Patent: Aug. 7, 1990

[54] PROCESS FOR THE PRODUCTION OF STEEL FROM FINE ORE HOT BRIQUETTED AFTER FLUIDIZED BED REDUCTION

[76] Inventor: Ralph Weber, Am Nordglacis 93, 423 Wesel, Fed. Rep. of Germany

[21] Appl. No.: 422,033

[22] Filed: Oct. 16, 1989

[30] Foreign Application Priority Data

Oct. 17, 1988 [DE] Fed. Rep. of Germany ....... 3835332

[51] Int. Cl.$^5$ ................................................. C22B 5/14
[52] U.S. Cl. ............................................. 75/26; 75/38; 75/40; 75/256; 266/160; 266/172
[58] Field of Search .................... 75/26, 38, 40, 256; 266/160, 172

[56] References Cited

U.S. PATENT DOCUMENTS 4,178,170  12/1979  Iacotti et al. ........................... 75/256
4,852,859  8/1989  Weber ................................. 266/901

FOREIGN PATENT DOCUMENTS 2228877  10/1987  Japan .................................. 266/172

Primary Examiner—Melvyn J. Andrews

[57] ABSTRACT

Fine ore is reduced in a circulating fluidized bed by a reduction gas in the presence of fine coal, the discharged mixture of iron sponge particles and fine coal is subjected to hot compacting and then fed to a melting vessel in which oxygen is injected into the molten material through nozzles. The melting vessel can also be supplied with scrap which has been pre-heated by the hot waste gases from the melting vessel, in a scrap preheater which is fitted onto the melting vessel.

7 Claims, 1 Drawing Sheet

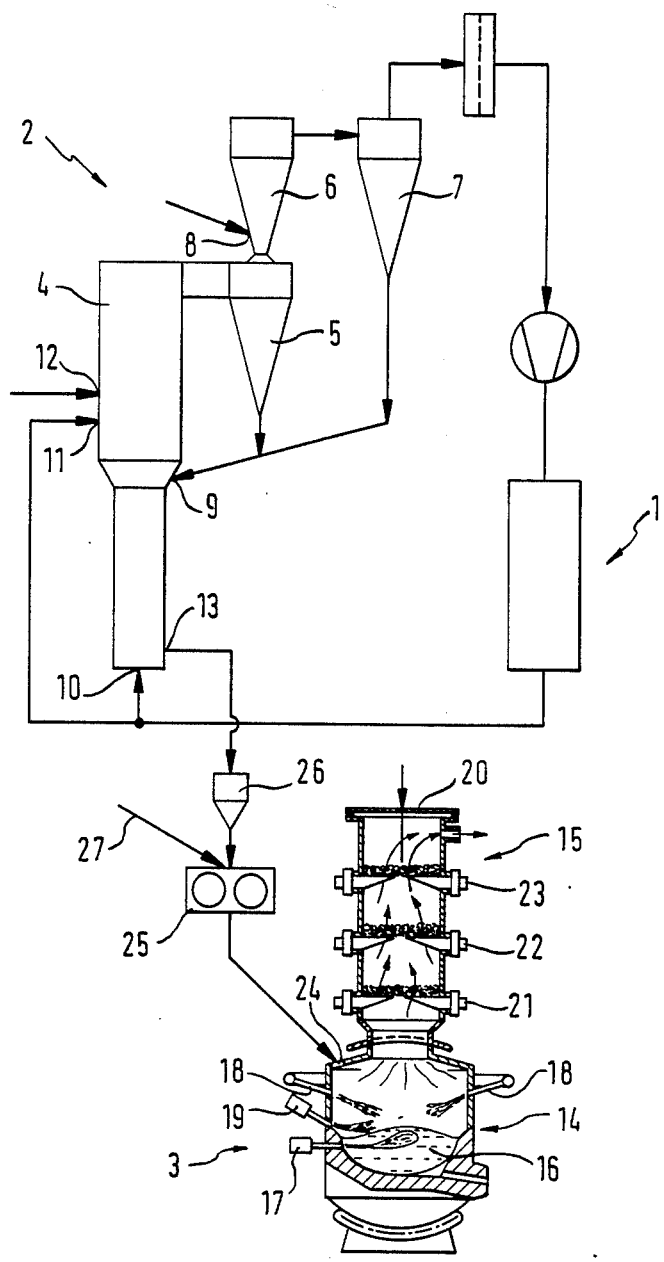

PROCESS FOR THE PRODUCTION OF STEEL FROM FINE ORE HOT BRIQUETTED AFTER FLUIDIZED BED REDUCTION

DESCRIPTION

The invention relates to a process for the production of steel from fine ore.

A process of that kind is known from German laid-open application (DE-OS) No. 21 32 150. In that known process for the direct production of steel, fine ore is reduced in successively disposed cyclones, the reduction gas used being the waste gas from the melting and refining unit, which consists of carbon monoxide. The reducing and melting process is then followed by a refining operation in the same vessel.

In the ELRED process, fine ore is 70% metallised in a circulating fluidised bed with coal and then passed to a direct current reduction furnace with hollow electrode, and processed to put it into the form of a preliminary metal. The electrical melting energy required is produced from the waste gases of pre-reduction and melting reduction operations. That process suffers from difficulty in restricting the discharge of carbon from the reduction unit, and in particular when the endeavour is to achieve a higher degree of metallisation in the reduction unit. At high reduction temperatures of over 900° C., a large amount of fine coal must be added to the reduction unit in order to prevent the iron particles from sticking together. The result of that is that a substantial amount of gasified particles of coal is discharged, together with the iron sponge particles. A large part of the coal must be removed from the discharged material, before being introduced into the electric arc furnace, for which purpose it is necessary to provide for cooling and expensive separation of the particles of coal from the particles of metal.

In the last 20 years, the production of steel from scrap has experienced an enormous increase as on the one hand that starting material is available in large quantities and on the other hand the amount of energy required is comparatively low. However the problem which arises in that connection, for the production of high-grade steels, is that the scrap starting material of the desired quality is not available. Scrap is often contaminated by alloy constituents and also by virtue of coating processes and other treatment processes as are used in the mechanical engineering industry.

It is possible to produce improved qualities of steel if, besides scrap which contains impurities, original blast-furnace metal such as crude or pig iron from a blast furnace or sponge iron (directly reduced iron ore) is used. Depending on the requirements in respect of quality, the relationship as between scrap and virgin metal in the charge mixture is to be variable within wide limits. In what are known as ministeel works, sponge iron from iron ore is primarily used as virgin metal.

The object of the present invention is to increase the degree of metallisation in the reduction unit and to improve the level of thermal efficiency in the sponge iron particle melting process. The invention also seeks to provide that steel can be produced directly from the iron sponge without the intermediate step of producing crude or pig iron. The invention also seeks to provide that not only directly reduced fine ore, that is to say iron sponge, but also iron scrap, can be used as the charge materials, while in regard to the requirements in respect of quality of the steel produced, the ratio of the components in the mixture is to be variable within a wide range.

Accordingly the operation of reducing the fine ore is performed in the presence of coal in a fluidised bed, preferably in a circulating fluidised bed, in which reduction gas is used as the fluidising gas in order to increase the degree of metallisation. A reduction unit which is suitable for that purpose is the circulating fluidised-bed reactor developed by Lurgi GmbH. In contrast to the above-mentioned ELRED-process, that reactor is used as a finishing reduction unit with a hot reduction gas as the fluidising medium. The disadvantage of a greater amount of coal being discharged, which is involved in that mode of operation, is eliminated by using a melting vessel in which that discharge of coal from the reduction unit can be utilised as an energy source. What is particularly suitable in that connection is the steel production furnace which is known by the name EOF (Energy Optimising Furnace) and which as an oxygen reactor accepts not only coal in the input materials but additionally requires coal as a heat source for the process. So that the degassed coal particles which are discharged from the reduction unit and the iron sponge particles can be suitably fed to the melting and reaction vessel, the mixture is hot-compacted after discharge from the reduction unit and only then loaded into the melting vessel. In that way the two materials are put into a condition of adequate physical size and density for them to be able to pass through the layer of slag and to melt and dissolve within the bath. The carbon is dissolved in the bath and, due to the oxygen which is injected into the bath, permits the optimum feed of heat into the molten material.

The waste gases which are produced by the oxidation reactions in respect of the carbon undergo post-combustion in the vessel and are used to pre-heat scrap which can be fed to the melting and reaction unit as a further charge material.

This system is distinguished by enjoying a high level of flexibility in regard to the choice of the charge material, by virtue of low levels of cost in regard to raw materials and therewith very low steel production costs, even for steels which satisfy the highest requirements in respect of quality.

The invention is described in greater detail by means of an embodiment with reference to a drawing which illustrates the principle of the process according to the invention for the production of steel from fine ore.

The installation which is diagrammatically shown in the drawing includes a reduction gas generator 1, a reduction unit 2 and a melting vessel 3. The reduction gas generator is in the form of a reformer which converts the waste gas from the reduction unit into a high-grade reduction gas which is fed to the last stage of the reduction unit 2, at a temperature of about 900° C. The reduction unit operates on the principle of a circulating fluidised bed and includes a finishing reduction stage 4 and pre-reduction cyclones 5, 6 and 7. Fine ore is fed to the pre-reduction cyclone 6 by way of an inlet 8. The fine ore is pre-heated and pre-reduced with the hot waste gas from the finishing reduction cyclone 4, before the ore is fed to the finishing reduction stage 4 by way of a pre-reduction cyclone 7, through an inlet 9. In the stage 4 into which hot reduction gas at a temperature of about 900° C. is introduced through inlets 10 and 11 as a fluidisation gas and to which fine coal is additionally supplied by way of an inlet 12, the fine ore particles are reduced to a very high degree of metallisation (>95%). The iron sponge particles which are obtained in that way are discharged from the finishing reduction stage through an outlet 13 together with degassed coal particles at a temperature of about 800° C. In that connection the proportion of coal particles is about 10% by weight.

The waste gas from the reduction unit leaves the pre-reduction stage 7 at a temperature of about 400° C. and is passed to the reformer of the reduction gas generator 1 after passing through a hot gas filter.

The melting vessel or hearth 14 of an EOF (Energy Optimising Furnace) which is described in the journal MBM-Metal Bulletin Monthly, October 1986, on pages 47 to 51, is used for melting the iron sponge particles. Arranged above the melting vessel 14 is a charging material preheater 15. The melting vessel 14 accommodates a molten iron bath 16. Beneath the surface of the molten iron bath 16, under-bath nozzles 17 open into the melting vessel 14 for the injection of oxygen and possibly solid materials such as pulverised coal or additives, by means of a carrier gas. Above the level of the bath, further nozzles 18 open into the melting vessel 14 for the injection of oxygen or pre-heated air which can be supplied by way of a ring conduit and which serves for post-combustion of the CO-bearing waste gas which rises out of the molten bath. The installation also has oil-oxygen burners 19.

The charging material pre-heater 15 is in the form of a container which can be closed at the top by a horizontally movable cover 20. The container is subdivided into three superposed pre-heater portions by grid portions 21, 22 and 23 which are movable by an actuating means between a closed position in which they project into the interior of the container (being the position illustrated) and an open position in which they are withdrawn from the interior of the container. The charging material is accommodated in the pre-heater portions and the hot waste gases from the melting vessel, as indicated by arrows, flow through the charging material and in so doing heat it. The charging material essentially comprises solid iron materials such as steel scrap, which are to be melted down.

Also provided in the melting vessel 14 is a closable intake opening 24 for the hot discharge from the reduction unit 2. However that hot discharge is not fed to the melting vessel 14 directly but only after a hot compacting operation. For that purpose, provided between the outlet 13 of the finishing reduction stage 4 and the intake opening 24 of the melting vessel 14 is a hot compacting stage 25, upstream of which is disposed a storage means 26 for the discharged mixture of iron sponge particles and coal. The hot compacting stage 25 can also be supplied with fine coal by way of an additional conduit 27, whereby it is possible to increase the ratio of coal/iron sponge in the mixture if the supply of energy to the melting vessel is to be increased.

The iron sponge-coal briquettes which leave the hot compacting stage 25 are of such a size and density that, when they are charged into the melting vessel, they can penetrate the layer of slag on the molten bath 16 and pass into the molten material. Depending on the carbon content in the molten material, the coal is quickly dissolved in the molten material and, under the influence of the oxygen which is injected through the under-bath nozzles 17, provides the melting energy required for melting the iron sponge. Preferably, the melting vessel is charged not only with the hot iron sponge-coal briquettes but also scrap which is preheated in the charging material pre-heater 15, in which respect the ratio between the starting materials, fine ore and scrap, is variable within wide limits. The additional energy required when using a larger amount of scrap can be partially supplied by the oil-oxygen burners 19, partially by the additional supply of carbon by way of the additional conduit 27 going to the hot-compacting stage 25, or directly by way of the nozzles 15.

In a hybrid mode of operation, that is to say when charging the melting vessel with iron sponge-coal briquettes and scrap, it is advantageous for the iron sponge-coal briquettes to be respectively introduced prior to the scrap so that the briquettes are urged downwardly by the scrap which applies a downward loading thereto, thereby improving the conditions for dissolution of the carbon introduced by the briquettes, in the molten material.

Preferably, when carrying out the tapping operation after melting and refining of the molten steel material, a residue (sump) is retained in the melting vessel 14 for the subsequent melting process.

I claim:

1. A process for the production of steel from fine ore comprising the step of reducing the fine ore in the presence of coal in a fluidized bed of a reduction unit together with a reduction gas to form iron sponge particles, and passing the particles to a melting vessel in which they are melted with a feed of coal and oxygen and are refined to produce steel, the improvement in said process comprising the step of subjecting a mixture of iron sponge particles and fine coal which is discharged from the reduction unit to hot compacting to form hot iron sponge-coal briquettes before said briquettes are introduced into the melting and refining vessel.

2. A process according to claim 1, wherein the fine ore is pre-reduced in a pre-reduction stage before it is subjected to a finishing reduction operation in a finishing reduction stage at temperatures of about 900° C.

3. A process according to claim 1 or claim 2, wherein fine coal is additionally supplied to the discharged mixture of iron sponge particles and coal prior to the hot compacting operation.

4. A process according to one of claims 1 or 2, wherein the melting and refining vessel is also charged with scrap.

5. A process according to one of claims 1 or 2, wherein the scrap is pre-heated by the hot waste gases from the melting and refining vessel.

6. A process according to one of claims 1 or 2 wherein, for the purposes of producing melting of the iron sponge-coal briquettes and possibly scrap, oxygen is injected through under-bath nozzles into a molten mass which is present in the melting and refining vessel and which at least partially covers the materials to be melted.

7. A process according to one of claims 1 or 2, wherein the CO-bearing gases which issue when oxygen is injected into a molten mass in the melting and refining vessel are subjected to post-combustion in the vessel and are passed through a scrap preheater arranged above the melting and refining vessel.

* * * * *